May 6, 1930.  C. KECK  1,757,839
VEHICLE SUSPENSION MEANS
Filed Jan. 13, 1927  2 Sheets-Sheet 2
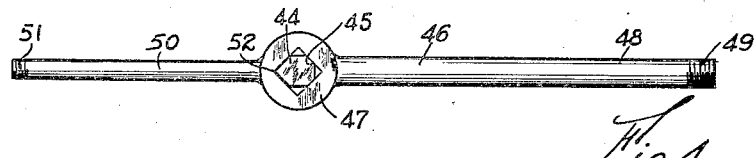
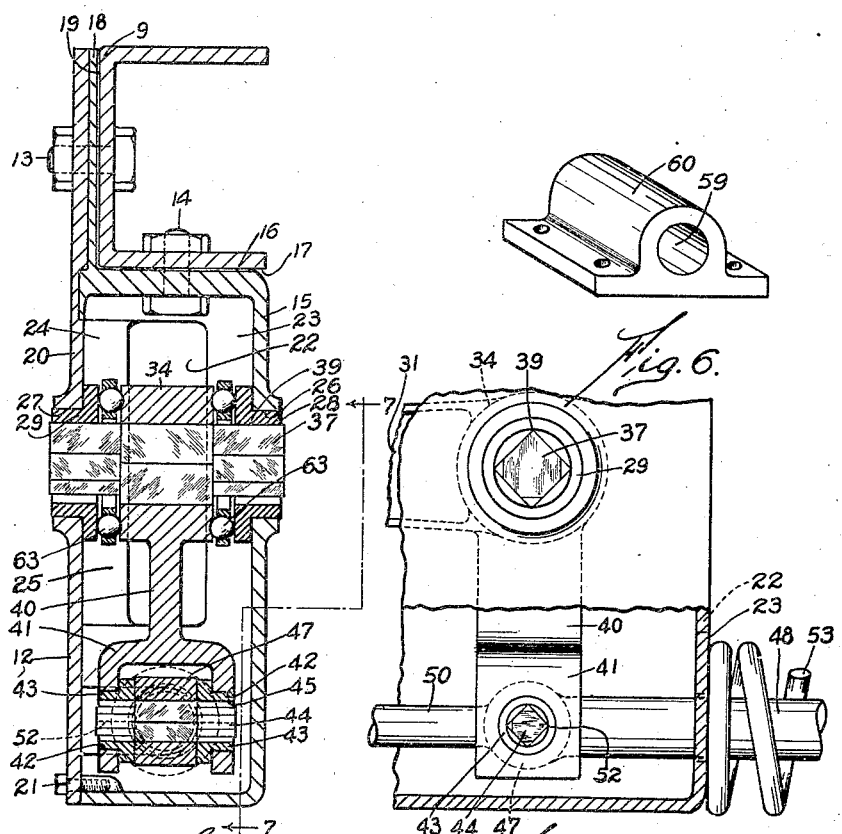
Inventor
Christian Keck,
By Murray and Gugelter
Attorneys.

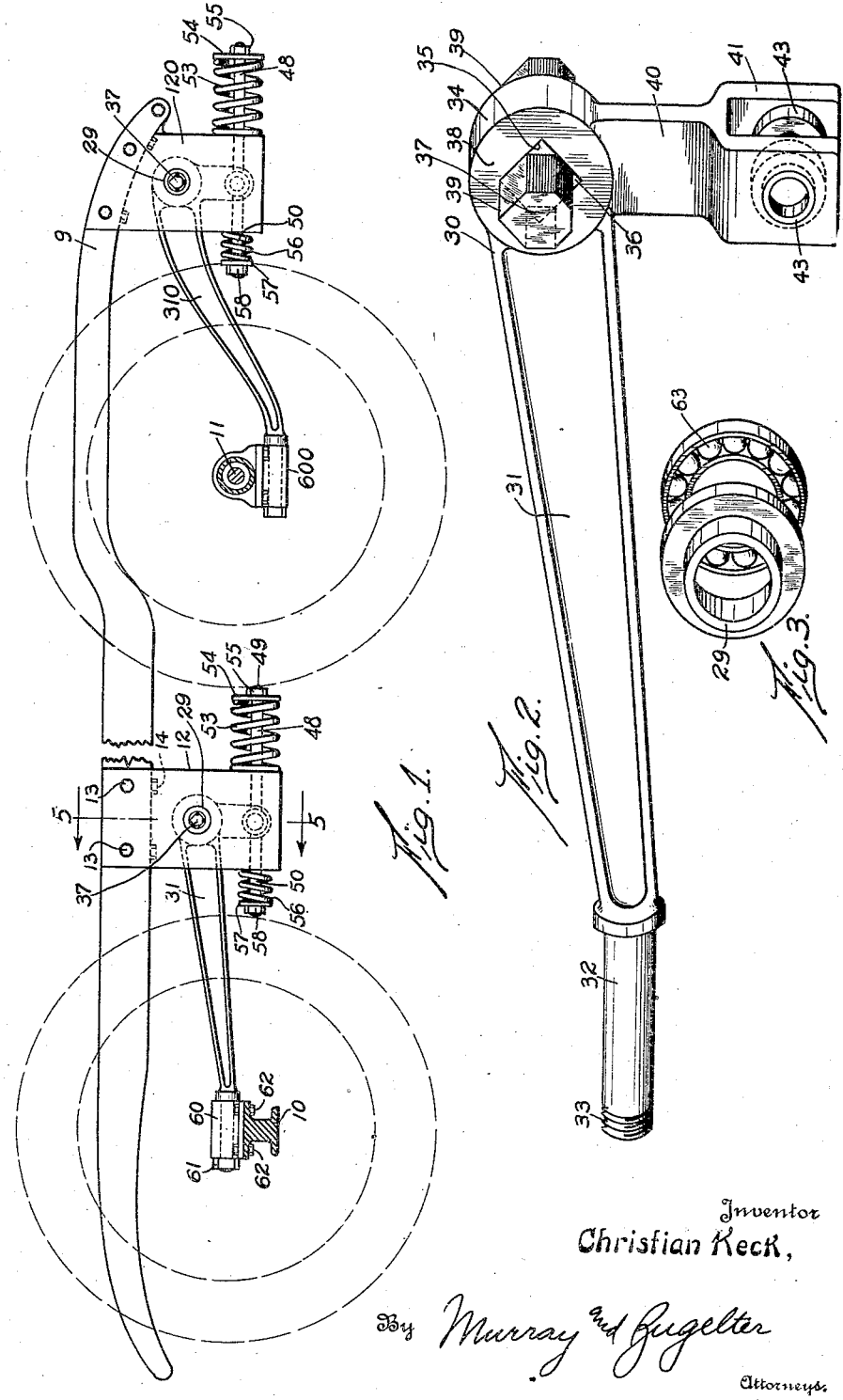

Patented May 6, 1930

1,757,839

UNITED STATES PATENT OFFICE

CHRISTIAN KECK, OF CRESCENT SPRINGS, KENTUCKY

VEHICLE-SUSPENSION MEANS

Application filed January 13, 1927. Serial No. 160,998.

This invention relates to vehicle suspension means and has for an object the provision of means whereby the commonly used and expensive springs are eliminated.

Another object is to provide a vehicle suspension means which is practically frictionless and which is free from wear so that there is little possibility of rattling and looseness after a period of use.

Another object is to provide a suspension means of the class referred to which is adaptable to adjustment to a fine state of balance.

Another object is to provide a device of this kind wherein none of the shock, jar and vibration of the wheels and axles of the vehicle can be transmitted to the body thereof.

These and other objects are attained by the means described herein and disclosed in the accompanying drawings, in which:—

Fig. 1 is a cross sectional side elevational view of a vehicle chassis, part being broken away, having suspension devices of the invention embodied therein.

Fig. 2 is an enlarged perspective view of a lever structure forming a part of the invention.

Fig. 3 is a perspective view of a pair of mounting elements for the lever structure shown in Fig. 2.

Fig. 4 is an elevational view of a rod forming a detail of the invention.

Fig. 5 is a cross sectional view on line 5—5 of Fig. 1.

Fig. 6 is a perspective view of a part forming a detail of the invention.

Fig. 7 is a view taken on line 7—7 of Fig. 5. In the structure of the vehicle suspension of the present invention there is provided a simple bell crank lever structure having a substantially frictionless fulcrum mounting and carrying a rod which has a similar substantially frictionless fulcrum mounting on said lever. A casing member forms a means for rigidly mounting the lever on the chassis and also serves as an abutment for the spring elements of the devices.

Referring to the drawing, in Fig. 1 there is shown a longitudinal channel element 9, front axle 10 and rear axle 11. One of the suspension elements of the invention is provided adjacent each of the four wheels of the vehicle, and these suspension elements are identical in operation and substantially the same in structure and method of mounting. Rearwardly of the front axle 10, on each of the longitudinal channels 9 a casing 12 is secured by any suitable means such as bolts 13 and 14. The casing 12 is preferably made in two parts so that the operating parts may be conveniently assembled therein. The housing portion 15 of casing 12 comprises a box like structure having a flat top 16 which abuts the bottom face 17 of channel member 9 and a flange 18 extending at right angles to the top 16 and adapted to abut the outer face 19 of channel member 9. A cover portion 20 provides a cover for the open side of the member 15 and has its upper portion in abutment with the flange 18. The bolts 13 serve to clamp the upper end of cover 20 to flange 18 and suitable cap screws 21 bind the lower portion of the cover to the member 15. Casing member 15 has an opening 22 in its end wall 23, which end wall is also cut away to receive interfitting lugs 24 and 25 which extend at right angles from the edges of cover member 20. The housing and cover comprising casing 12 may be malleable castings thereby providing a comparatively light weight but very strong mounting for the suspension means. Housing 15 and cover 20 have aligned bores 26 and 27 in which are seated flanged bearing rings 28 and 29 of hardened steel.

A bell crank lever 30 has an arm 31 provided with a shouldered integral stud 32 threaded as at 33 at the extreme end thereof. A hub 34 has a transverse angular opening 35 extending therethrough. The opening 35 is conveniently made square for receiving the central square portion 36 of a fulcrum member 37 which is of hardened steel. The opposite ends of the fulcrum member 37 extending beyond opposed side faces 38 of hub 34 are also angular in cross section and of smaller area than the central portion 36. As shown in Fig. 2 these ends are preferably pentagonal for providing top knife edges 39. The bell crank lever 30 is fulcrumed in the casing by passing the opposite projecting ends of fulcrum 37 into the hollow interiors of bearing rings 28 and 29.

A short integral arm 40 extends downwardly from hub 34 and substantially at right angles to lever arm 31. The arm 40 is bifurcated to provide branches 41 which have aligned perforations 42 therein. A pair of flanged bearing rings 43 of hardened steel are mounted in perforations 42 for receiving the opposite ends of a second fulcrum member 44 which is nonrotatably mounted in an angular bore 45 in rod 46. The rod 46 is provided with a central disc like hub portion 47 having the bore 45 extending transversely therethrough. The rod 46 has a long arm 48, threaded at its end as at 49 and an aligned short arm 50 threaded at its free end as at 51. The fulcrum member 44 has knife edges 52 which extend in the direction of the threaded end 51 of the short arm of rod 46. This structure serves as a fulcrum mounting for the rod 46 between the branches 41 of yoke arm 40. The arms 48 and 50 of rod 46 extend through suitable openings in the casing 12 and project from opposite sides thereof (see Fig. 1). A heavy coil spring 53 encircles the arm 48 of rod 46 and has its one end in abutment with an outer wall of the casing 12. The opposite end of spring 53 abuts a suitable washer 54 which is retained adjacent the threaded end 49 of arm 48 by means of a suitable lock nut 55.

The opposite projecting arm 50 has a comparatively lighter coil spring 56 which abuts the opposite side of casing 12 and is retained in position by a washer 57 and lock nut 58. The arm 31 of the bell crank lever extends through opening 22 in the casing 12 and has its stud portion 32 fixedly mounted in the bore 59 in a box 60 by means of a lock nut 61. The box 60 is securely mounted on the top of front axle 10 by any suitable means such as by bolts 62. As will be seen in Fig. 5, suitable ball bearings 63 are interposed between the opposite faces of hub 34 and the flanges of bearing rings 28 and 29.

From the foregoing and by reference to Fig. 1 it will be apparent that the weight of the chassis and body (not shown) mounted on the chassis will cause the bearing rings 28 and 29 to rest in a state of balance on the knife edges 39 of fulcrum member 37. The bell crank lever rigidly attached to fulcrum member 37 will tend to move the short arm 40 forwardly and to carry the rod 46 with it. Coil spring 53 abutting the casing 12 is slightly compressed through this action and serves to sustain the weight of the chassis and body so that this weight is suspended from axle 10 through the agency of arm 31. The small spring 57 serves to cushion the arm 31 and axle 10 against downward movement such as occurs when the front wheel of a vehicle drops into a depression in the road. The heavier spring 53 cushions the effect of sudden upward movement of the front axle 10, this being the movement which results from a vehicle wheel striking an obstruction or raised placed on a roadway. It will be readily apparent that upward or downward movement of the axle 10 and the end of lever arm 31 will effect a very slight tilting of fulcrum member 37 which has its knife edge 39 always retained firmly against the top inner circumference of the bores in bearing rings 28 and 29. This knife edged fulcrum bearing is practically frictionless and causes practically no wear on the hardened steel knife edge and bearing rings. The ball bearings 63 preclude lateral movement of the forward end of arm 31 and also reduces to a minimum the friction between the side faces of hub 30 and the flanges of bearing rings 28 and 29.

The structures for suspending the rear ends of a vehicle chassis are substantially like the forward suspension element just described. The sole differences are found in the shape of casing 120 and lever arm 310. The casing 120 (see right hand side of Fig. 1) is suitably curved and flanged at its top to accommodate the rear horn of the channel member 9. The arm 310 is curved so that it may be secured beneath the rear axle 11 by means of a box 600 similar to the box 60 on the front axle.

It will be noted that the springs 53 may be tensioned by means of lock nuts 55 and springs 56 may be tensioned by means of lock nuts 58 so that either light or heavy vehicles may be simply and expeditiously mounted to ride smoothly and evenly without shock or rebound. The suspension devices of the invention require practically no care or attention, and need not be lubricated, except perhaps to preclude rusting of the parts. The movement of the bearing parts is very little and practically frictionless so that wear on the parts is negligible, for as long as the opposed springs 53 and 56 retain the knife edges against the bearing rings there is no possibility of rattling and loosening of parts during use.

While there has been shown herein but one practical embodiment of the invention, it will be understood that the invention is not to be considered as limited to the exact design shown, since this may be modified and varied within the spirit of this invention and within the scope of the appended claim.

What is claimed is

In combination a lever, a knife-edged fulcrum non-rotatably mounted in said lever, a pair of rings supported on opposite sides of the lever on said knife-edged fulcrum, and a ball race operative between each side of the lever and an adjacent side of one of said rings and surrounding the knife-edged fulcrum.

In testimony whereof, I, have hereunto subscribed my name this 31st day of December, 1926.   CHRISTIAN KECK.